United States Patent
Mowry et al.

(10) Patent No.: US 7,188,203 B2
(45) Date of Patent: Mar. 6, 2007

(54) METHOD AND APPARATUS FOR DYNAMIC SUPPRESSION OF SPURIOUS INTERRUPTS

(75) Inventors: Daniel Philip Mowry, Houston, TX (US); Andrew C. Cartes, Cypress, TX (US); Daniel John Zink, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 10/994,993

(22) Filed: Nov. 22, 2004

(65) Prior Publication Data

US 2005/0268016 A1    Dec. 1, 2005

Related U.S. Application Data

(60) Provisional application No. 60/574,326, filed on May 25, 2004.

(51) Int. Cl.
*G06F 13/00*  (2006.01)

(52) U.S. Cl. .......................... 710/262; 710/48; 710/49; 710/260

(58) Field of Classification Search .................. 710/48, 710/49, 260, 262
See application file for complete search history.

(56) References Cited

U.S. PATENT DOCUMENTS

| 5,564,060 | A | | 10/1996 | Mahalingaiah et al. | |
|---|---|---|---|---|---|
| 5,781,187 | A | * | 7/1998 | Gephardt et al. | ........... 710/309 |
| 5,790,871 | A | * | 8/1998 | Qureshi et al. | ............. 710/260 |
| 5,850,555 | A | | 12/1998 | Qureshi et al. | |
| 6,263,395 | B1 | * | 7/2001 | Ferguson et al. | ........... 710/262 |
| 6,356,963 | B1 | * | 3/2002 | Maguire et al. | .............. 710/48 |
| 6,708,241 | B1 | * | 3/2004 | Futral | ......................... 710/260 |

* cited by examiner

*Primary Examiner*—Glenn A. Auve (57) ABSTRACT

An apparatus and method for dynamic suppression of spurious interrupts in a computer system. More specifically, there is provided a method that comprises providing a look-up table comprising source IDs and corresponding time delays for each of a plurality of interrupt lines, monitoring each of the plurality of interrupt lines, and updating the time delays in the look-up table based on the monitoring of the interrupt lines, and a system for implementing the method.

37 Claims, 4 Drawing Sheets

METHOD AND APPARATUS FOR DYNAMIC SUPPRESSION OF SPURIOUS INTERRUPTS

CROSS-REFERENCE TO RELATED APPLICATIONS

This application claims Priority to Provisional Application Ser. No. 60/574,326, filed on May 25, 2004.

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

A typical computer communicates with a great many input output ("I/O") devices during its normal operation. One method of organizing and controlling this communication involves implementing interrupts. In an interrupt-based computer system, when one of the I/O devices requires attention from the computer's CPU, it generates an interrupt. When the CPU receives the interrupt, it typically stops its current task, sends an instruction to the I/O device to stop asserting the interrupt, and enters an interrupt mode to process the interrupt. Any interrupt generated by one of the I/O devices after the CPU has issued the instruction to de-assert the interrupt may be referred to as a "spurious interrupt". After completing the interrupt-related processing tasks, the CPU re-arms the device, then typically exits from the interrupt mode and sends an End of Interrupt ("EOI") signal to the interrupt controller. The EOI signal indicates that the CPU 12 has finished processing the interrupt and that the CPU is available to process another interrupt. If the CPU receives a spurious interrupt after this point, it may produce a "spurious interrupt error."

In recent years, the number of spurious interrupts errors generated by typical computer systems has increased dramatically because increases in CPU speed have outpaced increases in I/O device speed and chipset speed. Since most of these spurious interrupt errors are a natural byproduct of unavoidable propagation delays within the computer system in combination with the previously mentioned widening gap in system component speeds, they are not a real cause for concern. Accordingly, there is often no need to generate an error. Conventional methods of suppressing spurious interrupts involve inserting a fixed delay before the processor generates the EOI signal. While this method can be effective in suppressing spurious interrupts, it can degrade system performance more than necessary by introducing often unnecessarily lengthy delays in interrupt processing.

BRIEF DESCRIPTION OF THE DRAWINGS

Advantages of one or more disclosed embodiments may become apparent upon reading the following detailed description and upon reference to the drawings in which.

DETAILED DESCRIPTION

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
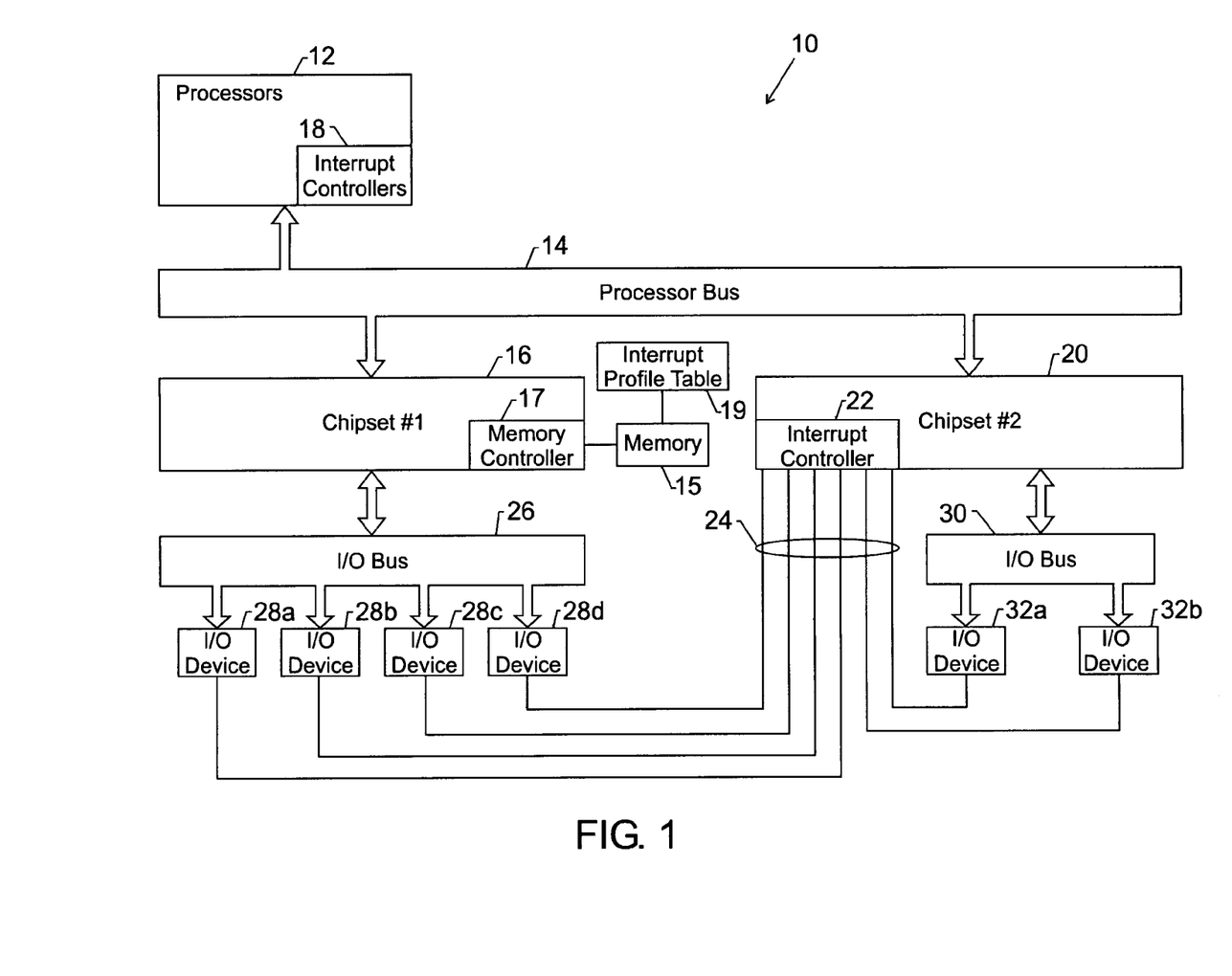
FIG. 1 is a block diagram illustrating an exemplary system for dynamic suppression of spurious interrupts in accordance with embodiments of the invention.

Turning now to the drawings and referring initially to FIG. 1, a block diagram of an exemplary system for suppression of spurious interrupts in accordance with embodiments of the invention is illustrated and generally designated by the reference numeral 10. The system 10 may include one or more processors or central processing units ("CPU"s) 12. The CPU 12 may be used individually or in combination with other CPUs 12. While the CPU 12 will be referred to primarily in the singular, it will be understood by those skilled in the art that a system with any number of physical or logical CPUs 12 may be implemented. Examples of suitable processors 12 include the Intel PENTIUM™ Processor family and the AMD ATHLON™ and OPTERON™ Processors. Each processor 12 may include a local interrupt controller 18 to handle interrupt requests that may be transmitted to the CPU 12. The structure of the local interrupt controller will vary based on the design of the processor 12. The CPU 12 may be operably coupled to one or more processor buses 14.

A first chipset 16 may also be operably coupled to the processor bus 14. The first chipset 16 is a communication pathway for signals between the processor and an input/output (I/O) bus 26 that is operably coupled to I/O devices 28a–28d. Depending on the configuration of the system, any one of a number of different signals may be transmitted through the first chipset 16. These signals include, but are not limited to, instructions from the processor 12, data from the memory 15, or interrupt requests from the I/O devices 28a–28d. Those skilled in the art will appreciate that the routing of signals throughout the system 10 may vary without changing the underlying nature of the system.

The first chipset 16 may contain a memory controller 17 that may be operably coupled to memory 15. Alternate embodiments, in which the memory 15 is operably coupled to the processor bus 14 or in which the memory controller 17 is operably coupled to the first chipset 16, or in which the memory controller 17 is embodied in the processor 12 are also within the scope of the invention. The memory 15 may be any one of a number of industry standard memory types such as static random access memory (SRAM) devices or dynamic random access memory (DRAM) devices which may be arranged as single in-line memory modules (SIMMs) or dual in-line memory modules (DIMMs), for instance. As described below, the memory 15 may be used to store instructions or data to facilitate the suppression of spurious interrupts.

Further, as discussed above, the first chipset 16 may be operably coupled to one or more of the I/O devices 28a–28d through to I/O bus 26. The I/O devices 28a–28d may include, but are not limited to, displays, printers, and external storage devices. Each of the devices 28a–28d is connected to an interrupt line 24. There may be a dedicated interrupt line 24 for each of the devices 28a–28d or one or more of the devices 28a-28d may share a single one of the interrupt lines 24. The interrupt lines 24 may be operably coupled to a second chipset 20. In alternate embodiments, the interrupt lines may be operably coupled to either the I/O bus 26 or the first chipset 16.

Similar to the first chipset 16, the second chipset 20 may also be a communication pathway for signals exchanged between the processor 12 and a second input/output ("I/O") bus 30 that is operably coupled to additional I/O devices 32a–32b. The second chipset 20 may also be operably coupled to the processor bus 14 to facilitate communication with each of the processors 12. Depending on the configuration of the system, any one of a number of different signals may be transmitted through the second chipset 20. These signals may include, but are not limited to, instructions from the processor 12, interrupt requests from I/O devices 32a–32b, or data from the memory 15, for instance.

The second chipset 20 may also include an interrupt controller 22. Typically the interrupt controller 22 is any one of a number of industry standard Programmable Interrupt Controllers ("PICs") or Advanced Programmable Interrupt Controllers ("APICs"). The interrupt controller 22 and the local interrupt controller 18a-18d may work separately or in conjunction in the processing of system interrupts. It will be understood by those skilled in the art that FIG. 1 merely illustrates one possible block diagram illustrating an exemplary system for suppression of spurious interrupts in accordance with embodiments of the invention, as described further below. Alternate embodiments, in which the components illustrated in FIG. 1 may be altered, combined, or deleted, are within the scope of the invention. For example, in alternate embodiments, the number of chipsets 16, 20 may vary or the interrupt lines 24 may be embedded within one of the I/O buses 26, 30.

The CPU 12 communicates with many of the I/O devices 28a–28d, 32a–32b during normal operation. One method of organizing and controlling this communication involves implementing interrupts. In an interrupt-based computer system, when an I/O device 28a–28d, 32a–32b requires attention from the CPU 12, it generates an interrupt. The interrupt typically includes both the request for attention and a request for a specific processing task for the CPU 12 to perform. An I/O device 28a–28d, 32a–32b typically generates the interrupt by transmitting a signal through the interrupt line 24 to the interrupt controller 22. The interrupt controller 22 then transmits a signal containing the interrupt to the CPU 12. When the CPU 12 receives the signal from the interrupt controller 22, it typically stops its current task, sends an instruction to the I/O device 28a–28d, 32a–32b to stop asserting the interrupt, and enters an interrupt mode to process the interrupt. After completing the interrupt-related processing tasks, the CPU 12 typically exits from the interrupt mode and sends an End of Interrupt ("EOI") signal to the interrupt controller 22. The EOI signal indicates to the interrupt controller 22 that the CPU 12 has finished processing the interrupt and that the CPU 12 is now available to process another interrupt. The EOI signal is generally implemented because the typical interrupt controller 22 will not transmit a next-in-time interrupt to the CPU 12 until it receives an EOI signal.

Any interrupt generated by one of the I/O devices 28a–28d, 32a–32b after the CPU 12 has issued an instruction to de-assert the interrupt may be referred to as a "spurious interrupt." A "spurious interrupt error" may be produced if the CPU 12 enters the interrupt mode to process a spurious interrupt. A warning message to the operator may accompany the spurious interrupt error. The risk of spurious interrupt errors is greatest when the CPU sends the EOI signal near in time to when it instructs an I/O device 28a–28d, 32a–32b to stop asserting the interrupt. In this case, the interrupt controller 22 will be instructed to start accepting new interrupts at approximately the same time that the I/O device 28a–28d, 32a–32b stops asserting its interrupt. Ideally, this would not cause a problem. However, as discussed further below, an I/O device 28a–28d, 32a–32b is unable to instantly 'turn off' the interrupt signal because of unavoidable propagation delays, and the interrupt line 24 continues to contain a residual interrupt signal for a period of time after an I/O device 28a–28d, 32a–32b has stopped asserting the interrupt. Since in this case the interrupt controller 22 has already received the EOI signal from the CPU 12, the interrupt controller 22 is open to receive new interrupts and can misinterpret the residual interrupt signal as a new interrupt. If this happens, the interrupt controller 22 will transmit the interrupt signal to the CPU 12, and the CPU 12 will stop its current task and re-enter an interrupt mode to process the spurious interrupt. As discussed above, this may result in a spurious interrupt error.

As discussed above, spurious interrupts are primarily caused by unavoidable propagation delays within the system. The unavoidable propagation delays within the system include, but are not limited to, the time required for the signal containing the CPU's instruction to reach an I/O device 28a–28d, 32a–32b, the time required for the I/O device 28a–28d, 32a–32b to respond to the instruction and de-assert the interrupt, and the time required for the residual interrupt signal to be purged from the system 10. Each one of the unavoidable propagation delays has a cumulative effect on total unavoidable propagation delay within the system 10. Thus, while the corrective actions for spurious interrupts discussed below typically compensate for the residual interrupt signal, it should be appreciated that in doing so, the corrective actions are actually compensating for the cumulative propagation delay. This is the case because the residual interrupt signal is the final unavoidable propagation delay in a series of unavoidable propagation delays within the system 10 and thus manifests the cumulative propagation delay.

As previously discussed, the number of spurious interrupt errors in a typical computer system has increased dramatically because increases in CPU speed have dramatically outpaced increases in I/O device speed and chipset speed. Most of these spurious interrupt errors are a natural by-product of the unavoidable propagation delays discussed above in combination with this widening gap in the speed of the system components. For this reason, most spurious interrupt errors are not a cause for concern, and there is no need to generate an error. It should be noted, however, that propagation delays that exceed a certain system-specific upper allowable time limit may be an indication of a more serious problem. Further, it may not be desirable to suppress spurious interrupts that indicate an underlying system problem outside of cumulative propagation delay.

Since the majority of spurious interrupt errors are not indicative of any real problem with the system 10, one conventional method of dealing with spurious interrupt errors is merely to ignore them. While simple to execute, this method has several prominent disadvantages. First, it produces tens, hundreds, or even thousands of warning messages to the user that are not indicative of any real problem with the system. This flood of warnings may cause the user to overlook warning messages that are indicative of an actual problem that should be addressed. Further, thousands of potentially insignificant warning messages can create user dissatisfaction and increased support costs to address the customer dissatisfaction. Finally, excessive processing of spurious interrupts may impinge system performance in two dimensions: first, the processor must dispatch spurious interrupts which reduces compute cycles used for legitimate work; second, the I/O subsystem may be throttled because the processor spends more time than necessary in interrupt processing for spurious interrupts, thus neglecting other I/O devices.

Another conventional method of handling spurious interrupt errors is for the CPU 12 to delay transmitting the EOI signal to the interrupt controller 22 for a fixed period of time to compensate for the propagation delay. While this methodology can be very effective in reducing spurious interrupt errors, it can degrade overall system performance by over compensating for propagation delay because the unavoidable propagation delay is not the same for each of the I/O devices 28a–28d, 32a–32b connected to the system 10. For example, to avoid 95% of spurious interrupt errors, the fixed EOI signal delay must be set longer than 95% of the propagation delays. This creates an obvious inefficiency because in the vast majority of cases, the fixed EOI signal delay will be longer than necessary to avoid the spurious interrupt error. This excess delay is time that the processor 12 could be using to perform other tasks.

Unlike the systems described above which either ignore the spurious interrupt problem or insert a fixed delay into the interrupt service routines, this presently disclosed system 10 can determine a corrective action dynamically on a per interrupt basis. The possible corrective actions include, but are not limited to, implementing a delay, generating a warning message for the operator, logging the event, masking the offending interrupt, or deactivating the affected device. Embodiments of the present invention can dynamically adjust the corrective action based on a variety of factors, including changes to the system configuration, system activity level, processor speeds or throttling, or differences/variations in signal timing across chipset lots or computer models.

Further, unlike previous systems, the present techniques may also employ a look-up table 19 (hereafter referred to as an "interrupt profile table") that permits the system 10 to maintain a separate delay value for each interrupt. The interrupt profile table 19 allows the system 10 to "fine-tune" the optimal delay for each interrupt line 24 without arbitrarily penalizing other functions of the I/O devices 28a–28d, 32a–32b assigned to different interrupts or other I/O devices that depend on the same software device driver. By profiling the interrupts and calibrating a delay specific to each interrupt line 24, this invention improves system performance, processing speed, and customer satisfaction with the system 10. In addition, the interrupt profile table 19 may also comprise other corrective actions in addition to or in place of a time delay.

Figure 2:
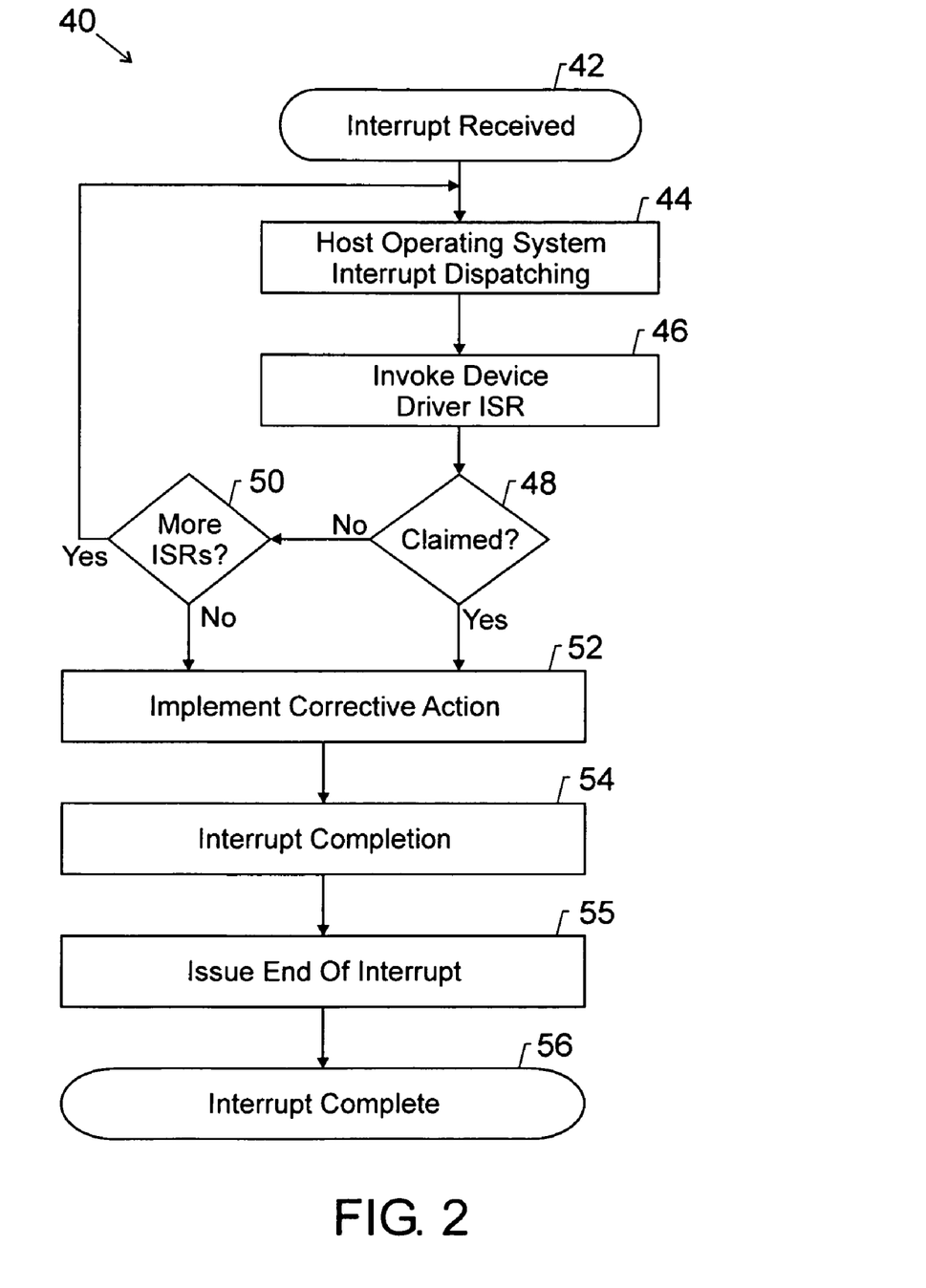
FIG. 2 is a flow chart illustrating an exemplary interrupt management scheme in accordance with exemplary embodiments of the invention.

Referring now to FIG. 2, a flow chart illustrating an exemplary process for interrupt management in accordance with exemplary embodiments of the present invention is depicted and generally designated by the reference numeral 40. In one embodiment, the system 10 employs the process 40 in dispatching interrupts from the I/O devices 28a–28d, 32a–32b. The process 40 begins when the CPU 12 receives an interrupt as indicated in block 42. After the interrupt is received, the system 10 begins the process of answering the interrupt as illustrated in block 44. This process is also known as "interrupt dispatching." During the interrupt dispatching process, the CPU 12 transmits an instruction to the I/O device 28a–28d, 32a–32b that asserted the interrupt instructing that I/O device 28a–28d, 32a–32b to stop asserting the interrupt. Next, the system 10 may invoke an Interrupt Service Routine ("ISR") that corresponds to the I/O device 28a–28d, 32a–32b that generated the interrupt as illustrated in block 46. If the system 10 is unable to find an ISR that corresponds to the I/O device 28a–28d, 32a–32b that requested the interrupt, the system 10 may generate a warning message (not shown).

After invoking the device driver ISR (block 46), the system 10 determines whether or not any one of the I/O devices 28a–28d, 32a–32b claims the ISR as illustrated in block 48. If the ISR is claimed, the system may implement a corrective action as indicated in block 52. If the ISR is not claimed by one of the I/O devices 28a–28d, 32a–32b, the system will determine whether or not there are other ISRs that may be associated with the particular interrupt being asserted as shown in block 50. Typically there will be other ISRs associated with the particular interrupt if two or more I/O devices 28a–28d, 32a–32b are sharing a single interrupt line 24. Since in this situation, the system 10 cannot determine which of the I/O devices asserted the interrupt, the system will invoke each of the multiple ISRs associated with the particular interrupt to ensure that the interrupt request did not come from any of the I/O devices 28a–28d, 32a–32b sharing the interrupt line 24. Interrupt line sharing can occur with any I/O device but is especially typical in PCI I/O devices. If the system 10 has invoked all of the ISRs associated with a particular interrupt and none of them have been claimed by one of the I/O devices 28a–28d, 32a–32b, the system flags the interrupt as spurious.

Next, the system 10 may implement a corrective action as illustrated by block 52. In prior systems, this corrective action typically only involved adding a fixed delay. Corrective actions in accordance with the present techniques will be described further below with reference to FIG. 3. After the corrective action is complete, the system 10 deems the interrupt to be complete (block 54), and sends the End of Interrupt ("EOI") signal to the interrupt controller 22 as illustrated by block 55.

At this point, the interrupt controller 22 will once again begin transmitting interrupts to the CPU 12. As discussed above, it is at this point where the spurious interrupt problem is most likely to manifest itself. If the first time that the system 10 executed process 40, the corrective action (block 52) was either not performed (i.e. spurious interrupts are being ignored), or it was not sufficient to compensate for the unavoidable propagation delays, the system 10 will interpret the residual interrupt signal as a new interrupt and will once again execute the process 40. Since the residual interrupt signal is not indicative of any actual new interrupt request from one of the I/O devices 28a–28d, 32a–32b, none of the ISRs (block 48) will claim the interrupt. The residual interrupt signal will then be deemed a spurious interrupt as indicated by block 50, and a spurious interrupt error will be generated. Advantageously, the present system 10 addresses this problem by dynamically adjusting the corrective action (typically a time delay) such that in all but a certain percentage of cases, the system will not transmit the EOI signal (block 55) until after the residual interrupt signal has been purged from the interrupt line 24.

As discussed above, in one exemplary embodiment, the system 10 may employ an interrupt profile table 19 to permit the system 10 to individually adjust the corrective action for each interrupt line 24. The interrupt profile table 19 may be a static table based on the total number of interrupt lines 24, or it may be dynamically created as each interrupt line is asserted by one of the I/O devices 28a–28d, 32a–32b. In one embodiment, where there are up to 224 possible interrupt lines, the interrupt profile table 19 will contain 224 records. In this embodiment, the interrupt profile table 19 is automatically created by the software that handles interrupt registration during system boot-up. The interrupt profile table 19 may include a time delay and a "threshold scorecard value" for each of the interrupt lines 24 as described further below. The interrupt profile table 19 may also include an upper allowable limit, an upper threshold value, and a lower threshold value for each of the interrupt lines 24 as described further below. In alternate embodiments, the upper allowable limit, the upper threshold value, or the lower threshold value may be the same for each of the interrupt lines 24. In this embodiment, the upper allowable limit, the upper threshold value, or the lower threshold value may not be stored in the interrupt profile table 19. Lastly, as discussed above, the interrupt profile table 19 may also contain other corrective actions that the system 10 may employ in addition to or in place of a time delay.

The upper allowable limit for each time delay is the maximum delay that the system 10 may dynamically set for a particular interrupt. Once the system 10 reaches the upper allowable limit, it will stop dynamically increasing the time delay for a given interrupt line 24 even if further increases could reduce the number of spurious interrupt errors. The upper allowable limit may be set by the system operator, and may be the same for all interrupts or may be set individually per interrupt. The upper allowable limit is important because excessive propagation delays can be indicative of a serious problem with the affected I/O device 28a–28d, 32a–32b. Without an upper allowable limit, serious errors or data loss can occur if the CPU 12 delays too long before resuming the acceptance of interrupts from the interrupt controller 22.

As stated above, the interrupt profile table 19 may also contain the upper threshold value and the lower threshold value for each of the interrupt lines 24. The upper threshold value is the highest percentage of spurious interrupt errors that the system 10 will allow for a particular interrupt before the system increases the time delay to reduce the number of spurious interrupt errors. The system 10 will not, however, increase the delay time more than one fixed increment above the upper allowable limit. Similarly, the lower threshold value is the lowest percentage of spurious interrupt errors that the system 10 will allow for a particular interrupt line 24 before the system decreases the delay time in order to improve system performance. The system 10 cannot reduce the delay time below zero.

While the system 10 is running, it maintains a running tally of the current ratio of spurious interrupt errors to total interrupts processed called the threshold scorecard value. The threshold scorecard value is computed over a predetermined number of past interrupts (e.g., it may be computed over the last 256 processed interrupts, the last 1056 processed interrupts, etc.). If the threshold scorecard value is computed over the past 256 interrupts, the threshold scorecard value will be equal to the percentage of the last 256 interrupts for a particular interrupt line 24 that were spurious interrupt errors. The system 10 may use the threshold scorecard value to determine if and when the percentage of spurious interrupt errors for a particular interrupt line has exceeded the upper threshold value or has fallen below the lower threshold value.

The upper threshold value may be advantageously implemented because it is often inefficient to eliminate all of the spurious interrupt errors on a given interrupt line 24. To illustrate the point, if a 250 ns delay would be sufficient to compensate for 98% of the spurious interrupt errors for a particular interrupt line 24 and a 1 µs delay would be sufficient to compensate for 100% of spurious interrupt errors, even though the 100% solution will eliminate all of the spurious interrupt errors, it may be inefficient because 98% of the time, the system is delaying 750 ns more than required to compensate for the residual interrupt signal.

Similarly, the lower threshold value may be implemented because it may not be efficient to continue to implement a particular time delay simply because the threshold scorecard value is below the upper threshold value. For example, if a time delay anywhere in the range from 100 ns to 250 ns will produce the same number of spurious interrupt errors and generate a threshold scorecard value of 1%, and the lower threshold value is set at 2%, the system 10 could reduce the time delay from 250 ns to 100 ns without increasing the number of spurious interrupts errors. This decrease would increase the system speed without generating any additional spurious interrupt errors. As long as the threshold scorecard value is below the lower threshold value, the system 10 may continue to reduce the delay time until the delay time becomes zero. In this way, the system 10 is generally able to dynamically adjust the delay time to keep the threshold scorecard value between the upper and lower threshold values.

The upper and lower threshold values may be entered by an operator and are typically determined by balancing system efficiency with the elimination of spurious interrupt errors. In one exemplary embodiment, the upper and lower threshold values may be in the 1%–5% range, but either value can be configured higher or lower depending on the needs of the operator. The system may be configured to allow the operator to enter a unique upper and lower threshold value for each interrupt line 24 or may use the same upper and lower threshold values for all of the interrupt lines.

When the system 10 is first activated the time delay for each interrupt line 24 may be set to zero. As the system 10 runs, it will dynamically adjust the value of each time delay as discussed above and further described below with reference to FIG. 3. The upper allowable limit, the lower threshold value, and the upper threshold value are entered by the operator and are not dynamically adjusted as the system runs. If the time delay for a given interrupt line 24 remains at zero, then there have been very few, if any, spurious interrupt errors in recent history. Additionally, it is important to note that it is not uncommon for there to be a few stray spurious interrupt errors during device initialization and then no spurious interrupt errors for the interrupt line 24 after initialization. In this case, if the number of spurious interrupt errors during initialization never causes the threshold scorecard value to exceed the upper threshold limit, the time delay will remain at zero. (i.e. no short-term penalty). However, even if the number of spurious interrupt errors during initialization does briefly cause the threshold scorecard value to exceed the upper threshold limit, the time delay that is instituted will erode back to zero if no other spurious interrupts are processed (i.e. there is a short-term penalty, but no long-term penalty).

In one embodiment, one of the I/O devices 28a–28d, 32a–32b in the system 10 may be configured as a permanent or persistent storage device. In this embodiment, the interrupt profile table 19 may be stored on the permanent or persistent storage device and loaded when the system 10 is restarted. Among other advantages, this embodiment allows the system to skip the 'training period' that occurs if the time delay for each interrupt line 24 is initially set to zero after a reboot. In this embodiment, the system 10 will initially generate fewer spurious interrupt errors after a reboot than in an embodiment where the system 10 has to adjust each time delay from zero. In another embodiment, the system 10 may be configured to permit the operator to manually adjust the initial delay for a specific interrupt line or a specific I/O device 28a–28d, 32a–32b. This feature is particularly useful if a particular one of the interrupt lines 24 or the I/O devices 28a–28d, 32a–32b has a known problem, because the system 10 can be preset to compensate for the known problem.

Figure 3:
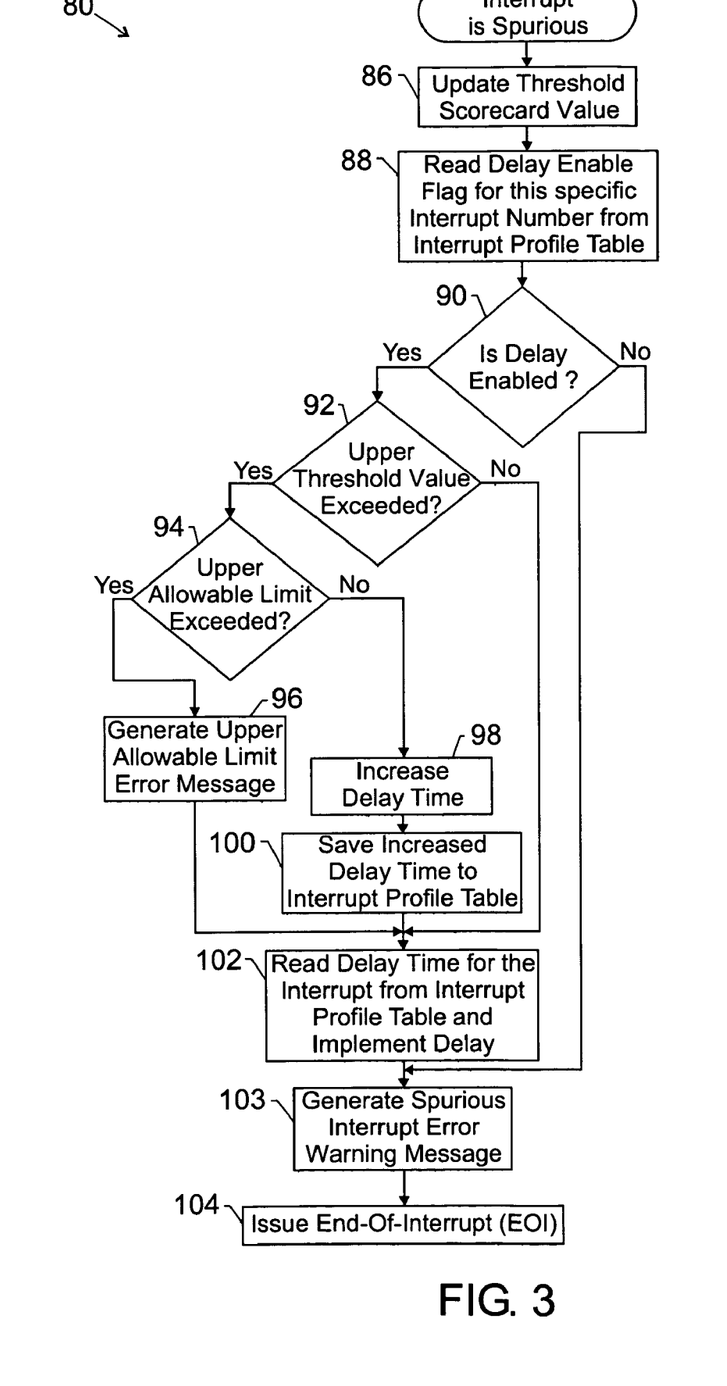
FIG. 3 is a flow chart illustrating an exemplary spurious interrupt suppression scheme in accordance with exemplary embodiments of the invention.

Turning now to FIG. 3, a flow chart illustrating an exemplary process for implementing corrective action in a spurious interrupt suppression scheme in accordance with embodiments of the invention is depicted and generally designated by the reference numeral 80. In one embodiment, the process 80 is executed by a modified interrupt driver in a host operating system's software kernel. Additional embodiments, which may be implemented through hardware or software, are within the scope of the invention. Initially, the system 10 determines whether or not the interrupt being processed is a spurious interrupt. If the interrupt being processed is a spurious interrupt, the system 10 will follow process 80. If the interrupt being processed is not spurious, the system 10 will follow process 105, which is described below in connection with FIG. 4. The system typically determines whether the interrupt is a spurious interrupt based on entry parameters (a spurious interrupt flag, for example) or by using the interrupt source ID parameter. However, other methods of identifying spurious interrupts may also be implemented.

If the interrupt is determined to be spurious, the system 10 updates the threshold scorecard value to reflect that the interrupt was spurious as indicated in block 86. Next, the system 10 reads the delay enable flag for the interrupt from the interrupt profile table 19 as indicated in block 88. In one embodiment, there is a unique delay enable flag and delay time associated with each interrupt in the interrupt profile table 19. Next, the system 10 determines whether the delay time read from the interrupt profile table 19 is enabled and should be used (block 90). If the delay is not enabled, the system will generate a spurious interrupt error warning message and issue the EOI signal as illustrated in blocks 103 and 104. If the delay is enabled, the system 10 determines if the threshold scorecard value exceeds the upper threshold value as indicated in block 92. If the threshold scorecard value does not exceed the upper threshold value, the system implements the time delay from the interrupt profile table 19 as indicated by block 102. If the threshold scorecard value does exceed the upper threshold value the system will determine whether the delay time from the interrupt profile table 19 has exceeded the upper allowable limit (block 94). If the upper allowable limit has been exceeded, the system 10 will generate an upper allowable limit error to notify the operator that the delay time has reached the upper allowable limit and cannot be further increased as indicated in block 96. If the upper allowable limit has not been exceeded, the system will increase the delay time for the interrupt and record the increased delay time to the interrupt profile table 19 as illustrated in blocks 98 and 100. In either case, the system 10 will implement the delay time from the interrupt profile table 19 as indicated by block 102. It should be noted, that if the system 10 increased the delay time (block 98), the system will implement this increased delay time. Lastly, the system 10 will generate a spurious interrupt message and issue the EOI signal as illustrated in blocks 103 and 104.

Figure 4:
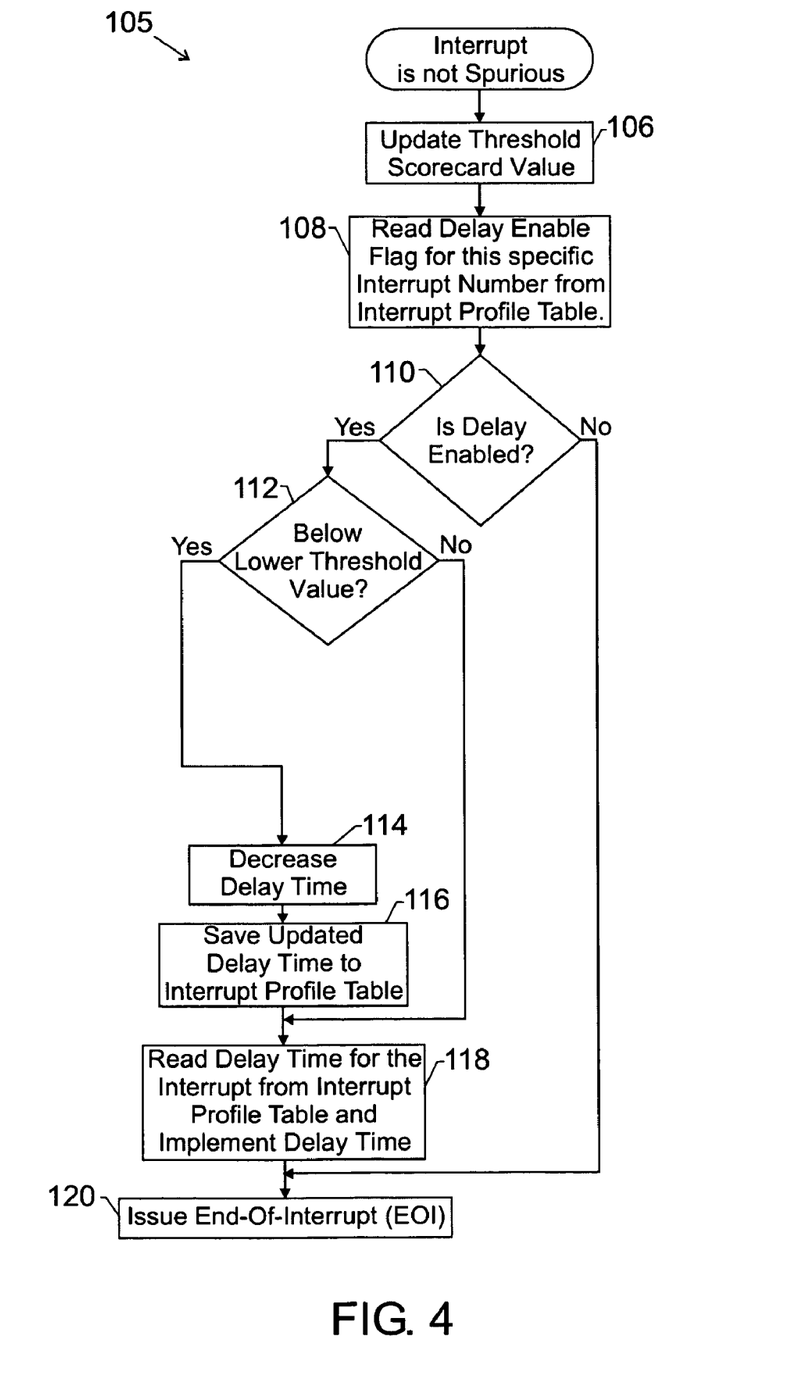
FIG. 4 is a flow chart illustrating an exemplary spurious interrupt suppression scheme in accordance with exemplary embodiments of the invention.

Turning now to FIG. 4, a flow chart illustrating an exemplary process for implementing corrective action in a spurious interrupt suppression scheme in accordance with embodiments of the invention is depicted and generally designated by the reference numeral 106. In one embodiment, the process 106 is executed by a modified interrupt driver in a host operating system's software kernel. Additional embodiments, which may be implemented through hardware or software, are within the scope of the invention.

The system 10 will follow process 105 if the interrupt is determined to not be spurious. First, the system 10 will update the threshold scorecard value for the interrupt in the interrupt profile table 19 as indicated in block 105. Next, the system 10 will read the delay enable flag associated with the interrupt from the interrupt profile table 19 as indicated in block 108. The system 10 will then determine whether or not the delay time from the interrupt profile table 19 is enabled and should be used as indicated in block 110. If the delay is not enabled, the system will issue the EOI signal as indicated in block 120. If the delay is enabled, the system 10 will determine if the threshold scorecard value is below the lower threshold value as illustrated by block 112. If the threshold scorecard value is above the lower threshold value, the system 10 will implement the delay from the interrupt profile table 19 as indicated in block 118. If the threshold scorecard value is below the lower threshold value, the system 10 will decrease the delay time associated with the interrupt and save the decreased delay time to the interrupt profile table 19, as indicated in blocks 114 and 116. Next, the system 10 will implement the delay associated with the interrupt from the interrupt profile table 19 (block 118). It should be noted, that if the delay time was decreased, the system 10 will implement the decreased delay time. Lastly, the system will issue the end of interrupt signal to the interrupt controller (block 120). As described above, transmitting the EOI signal will enable the interrupt controller to transmit new interrupts to the CPU 12.

It should be noted that with minor modifications readily apparent to those skilled in the art, the system 10 can also be used to assist in debugging device drivers that are suspected of creating excessive spurious interrupt errors.

The base functions described above with reference to FIGS. 2 and 3 may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of operating a computer comprising:
   receiving an interrupt from a source;
   masking subsequent interrupts from the source until an end of interrupt signal is received;
   comparing the source of the interrupt with a look-up table comprising a plurality of source identifiers and time delays uniquely corresponding to each of the plurality of source identifiers; and
   if the source matches one of the plurality of source identifiers in the look-up table, delaying the transmission of the end of interrupt signal for a period of time equal to the time delay corresponding to the source.

2. The method, as set forth in claim 1, comprising adjusting the time delay to adjust a number of spurious interrupt errors from the source.

3. The method, as set forth in claim 2, wherein adjusting the time delay comprises increasing the time delay to reduce a number of spurious interrupt errors.

4. The method, as set forth in claim 3, wherein adjusting the time delay comprises notifying an operator if the time delay exceeds a pre-determined value.

5. The method, as set forth in claim 3, wherein adjusting the time delay comprises ceasing to increase the time delay if the time delay exceeds a pre-determined value.

6. The method, as set forth in claim 2, comprising determining a percentage of interrupts received from the source that are spurious interrupts.

7. The method, as set forth in claim 6, comprising adjusting the time delay to adjust the percentage of spurious interrupts received from the source.

8. The method, as set forth in claim 1, wherein the look-up table comprises an additional corrective action corresponding to one of the sources.

9. The method, as set forth in claim 8, comprising executing the additional corrective action corresponding to one of the plurality of source identifiers in the look-up table if the source matches one of the plurality of source identifiers on the look-up table.

10. The method, as set forth in claim 9, wherein executing the additional corrective action comprises producing a notification to an operator.

11. The method, as set forth in claim 1, comprising storing the look-up table in a persistent storage media.

12. The method, as set forth in claim 1, comprising retrieving the look-up table from a persistent storage media.

13. The method, as set forth in claim 1, wherein receiving an interrupt from a source comprises receiving an interrupt from an I/O device.

14. The method, as set forth in claim 1, comprising reducing the time delay uniquely corresponding to one of the source identifiers if a percentage of interrupts received from the source that are spurious interrupts is below a pre-determined threshold value.

15. A method of operating a computer comprising:
    receiving interrupts from a source;
    determining if one of the received interrupts is spurious; and
    if the received interrupt is spurious, executing a corrective action, wherein the corrective action comprises implementing a time delay before an end of interrupt signal.

16. The method, as set forth in claim 15, wherein implementing a time delay comprises increasing the length of the time delay.

17. The method, as set forth in claim 15, wherein executing a corrective action comprises masking the interrupt.

18. The method, as set forth in claim 15, wherein executing a corrective action comprises deactivating the source.

19. The method, as set forth in claim 15, wherein executing a corrective action comprises generating a warning message.

20. The method, as set forth in claim 15, comprising:
    computing a percentage of the received interrupts that are spurious interrupts;
    determining if the percentage of spurious interrupts has exceeded a pre-determined percentage;
    if the percentage of spurious interrupts has not exceeded the predetermined percentage, delaying transmission of an end of interrupt signal for a period of time associated with the interrupt.

21. The method, as set forth in claim 20, comprising:
    if a percentage of spurious interrupts exceeds the predetermined percentage increasing the period of time associated with the interrupt.

22. A method of operating a computer comprising:
    receiving interrupts from a source;
    determining if one of the received interrupts is spurious; and
    if the interrupt is not spurious, delaying the transmission of an end of interrupt signal for a period of time associated with the interrupt.

23. The method, as set forth in claim 22, wherein delaying transmission of an end of interrupt signal comprises delaying transmission of an end of interrupt signal for a period associated with the interrupt on a look-up table.

24. The method, as set forth in claim 23, comprising reducing the period of time associated with the interrupt on the look-up table.

25. The method, as set forth in claim 22, comprising:
    computing a percentage of received interrupts that are spurious interrupts;
    determining if the percentage of spurious interrupts is below a pre-determined percentage; and
    if the percentage of spurious interrupts is below a pre-determined percentage, decreasing the period of time associated with the interrupt.

26. A method of dynamically suppressing spurious interrupts comprising:
    receiving interrupts from a source;
    masking subsequent interrupts from the source until an end of interrupt signal is received;
    determining a percentage of processed interrupts received that have been spurious interrupts; and
    if the percentage of spurious interrupts is equal to or below a first pre-determined percentage and greater than a second pre-determined percentage, delaying the transmission of the end of interrupt signal for a pre-determined period of time.

27. The method, as set forth in claim 26, comprising:
    if the percentage of spurious interrupts is above the first pre-determined percentage:
    increasing the pre-determined period of time; and delaying the transmission of the end of interrupt signal for the pre-determined period of time.

28. The method, as set forth in claim 26, comprising:
if the percentage of spurious interrupts is below the second pre-determined percentage:
  decreasing the pre-determined period of time; and
  delaying the transmission of the end of interrupt signal for the pre-determined period of time.

29. A method of dynamically adjusting a look-up table for suppressing spurious interrupts comprising:
  providing a look-up table comprising source IDs and corresponding time delays for each of a plurality of interrupt lines;
  monitoring each of the plurality of interrupt lines; and
  updating the time delays in the look-up table based on the monitoring of the interrupt lines.

30. The method, as set forth in claim 29, wherein providing a look-up table comprises adding an entry to the look-up table when an interrupt line is asserted for the first time.

31. A computer system comprising:
  a source configured to transmit an interrupt to an interrupt controller;
  an interrupt controller configured to:
    receive an interrupt from the source; and
    mask subsequent interrupts from the source until receiving an end of interrupt signal; and
  a processor configured to:
    compare the source with a look-up table comprising a plurality of source identifiers and time delays uniquely corresponding to each of the sources; and
    if the source matches one of the plurality of source identifiers in the look-up table, delay transmission of the end of interrupt signal for a period of time equal to the time delay corresponding to one of the plurality of source identifiers in the look-up table.

32. The computer system, as set forth in claim 31, wherein the source configured to transmit an interrupt comprises an I/O device.

33. The computer system, as set forth in claim 31, wherein the processor configured to compare the source with a look-up table comprises a processor configured to compare the source with a look-up table stored in a permanent storage device.

34. A computer system comprising:
  a source configured to generate an interrupt; and
  a processor configured to:
    determine if the interrupt is spurious; and
    if the interrupt is spurious, execute a corrective action, wherein the corrective action comprises implementing a time delay before an end of interrupt signal.

35. The computer system, as set forth in claim 34, wherein the processor is further configured to increase the time delay specific to the interrupt if the interrupt is spurious.

36. A computer-readable storage medium storing computer instructions for execution by a computer to:
  provide a look-up table comprising source IDs and corresponding time delays for each of a plurality of interrupt lines;
  monitor each of the plurality of interrupt lines; and
  update the time delays in the look-up table based on the monitoring of the interrupt lines.

37. A tangible medium storing routines for execution by a computer, the routines comprising:
  a routine for receiving interrupts from a source;
  a routine for determining if one of the received interrupts is spurious; and
  a routine for delaying the transmission of an end of interrupt signal for a period of time associated with the interrupt if the interrupt is not spurious.

* * * * *